(No Model.)
H. D. McCONN.
HAND HARROW.
No. 462,726. Patented Nov. 10, 1891.
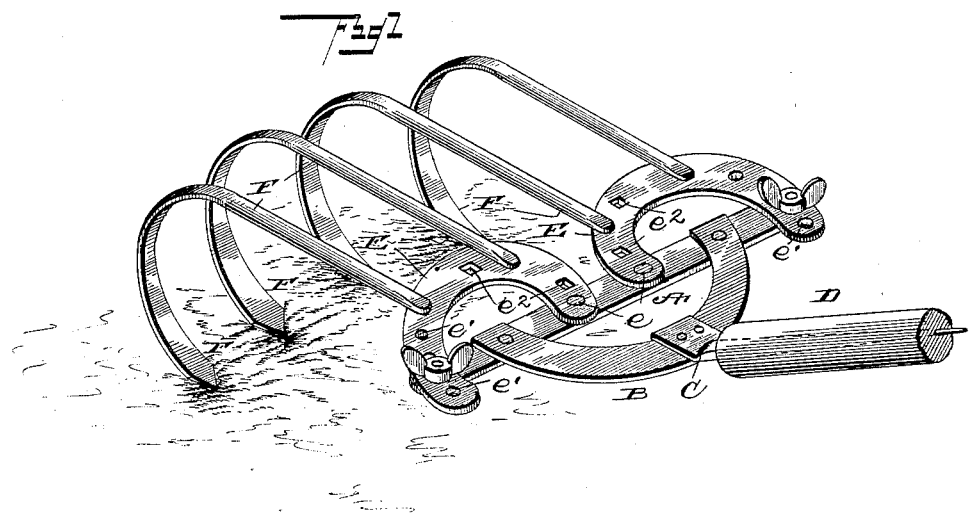
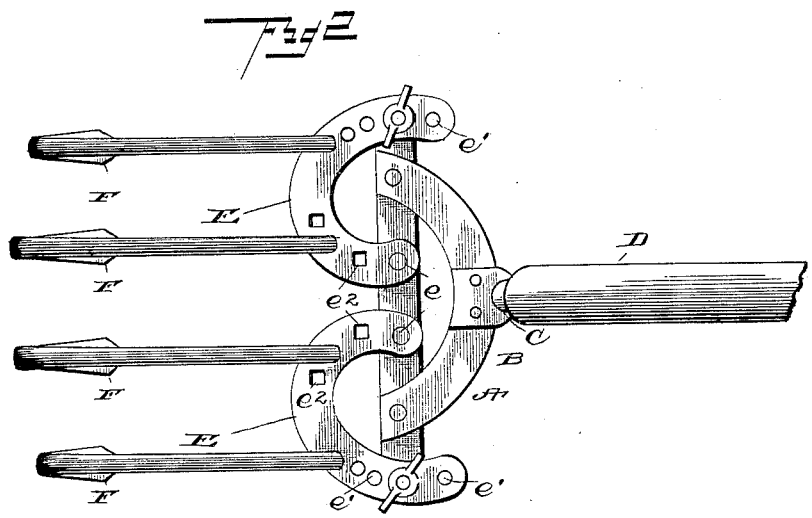
Witnesses
John Dairie
Frank B. Pyle
Harry D. McConn,
Inventor
By his Attorney Wm Moore

UNITED STATES PATENT OFFICE.

HARRY D. McCONN, OF FORT MADISON, IOWA.

HAND-HARROW.

SPECIFICATION forming part of Letters Patent No. 462,726, dated November 10, 1891.

Application filed September 24, 1891. Serial No. 406,736. (No model.)

*To all whom it may concern:*

Be it known that I, HARRY D. McCONN, a citizen of the United States, residing at Fort Madison, in the county of Lee and State of Iowa, have invented certain new and useful Improvements in Hand-Harrows; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention is an improvement in hand harrows or rakes; and the object of the invention is to provide an implement which may be used as an ordinary garden-rake or as a hoe for cultivating around plants by hand.

The invention consists of a rake or hand-harrow having teeth of any desired form, said teeth being adjustable, so as to vary the space between the same to suit the requirements of the work.

The invention further consists in a rake or hand-harrow having teeth carried upon pivoted arms, the position of said arms being variable to increase or diminish the distance between the teeth.

The invention further consists in a rake or hand-harrow having teeth carried upon a series of curved or semicircular pivoted arms, the free ends of said arms being adapted to be adjustably clamped to the supporting cross-bar to vary the distance between the teeth and adapt the same to different classes of work.

In the accompanying drawings, which illustrate the invention, Figure 1 is a side elevation of my improved hand-harrow. Fig. 2 is a plan view of the same.

In the drawings, A is a cross-bar of suitable length, which has riveted thereto the semicircular or angular brace B, carrying the shank or iron C, which enters and supports the handle D.

Pivoted upon the cross-bar are a number of levers E, which carry the teeth of the rake or hand-harrow, these teeth being lettered F F F F. The number of the pivoted teeth-supporting levers and the number of teeth carried thereby are not material, as these may be varied as desired; but for convenience I have shown two levers pivoted upon the cross-bar, each lever carrying two teeth. The levers are preferably semicircular in shape and have their inner ends pivoted to the cross-bar at the pivots or rivets $e\,e$. A series of holes are formed in the outer ends of the levers, which holes are adapted to align with an opening in each end of the cross-bar, and through this opening in the cross-bar and any one of the holes $e'\,e'$ a short bolt is passed, carrying upon its threaded end a thumb-nut. By this means the position of the levers may be varied at will by simply unscrewing the nut and withdrawing the bolt to allow the lever to be swung until another of the holes $e'$ aligns with the opening in the cross-bar, when the bolt is again inserted and the lever clamped securely in place. Instead of a series of holes, I may provide a slot conforming to the curve of the lever, and this will necessitate only the loosening of the thumb-nut. A number of square holes are formed in the levers, as at $e^2\,e^2$, and in these holes are inserted the squared angular-bent shanks of the teeth. The ends of the shanks which project through the levers are headed or hammered down to hold them firmly and rigidly in position. The teeth are preferably of the form shown in plan view, with their curved ends flattened and beveled to form cutting-edges.

Having thus described my invention, what I claim is—

1. A hand-harrow consisting of a cross-bar or frame, a handle connected to the cross-bar or frame, levers having one of their ends pivoted directly to the cross-bar and the other ends adjustable on said bar, and teeth carried by said levers.

2. A hand-harrow consisting of a cross-bar, curved levers having their inner ends pivoted near the center of the cross-bar and their outer ends adjustable on the cross-bar, teeth carried by the curved levers, and a handle for manipulating the harrow.

3. A hand-harrow consisting of a cross-bar, levers having one end pivoted to the cross-bar and the other ends adjustable on said bar, devices for adjusting the levers on the bar, curved teeth carried by said levers, and a handle for manipulating the harrow.

4. In combination, the cross-bar, the curved or angular brace riveted thereto carrying the shank for the handle, curved levers pivoted upon the cross-bar having their free ends adjustably connected to the cross-bar, and teeth rigidly secured to the levers, substantially as described.

In testimony whereof I affix my signature in presence of two witnesses.

HARRY D. McCONN.

Witnesses:
H. BEITHAN,
O. I. SEARLES.